Dec. 26, 1967  H. E. MORRIS  3,360,705
DC MOTOR FIELD CONTROL CIRCUIT
Filed June 1, 1965
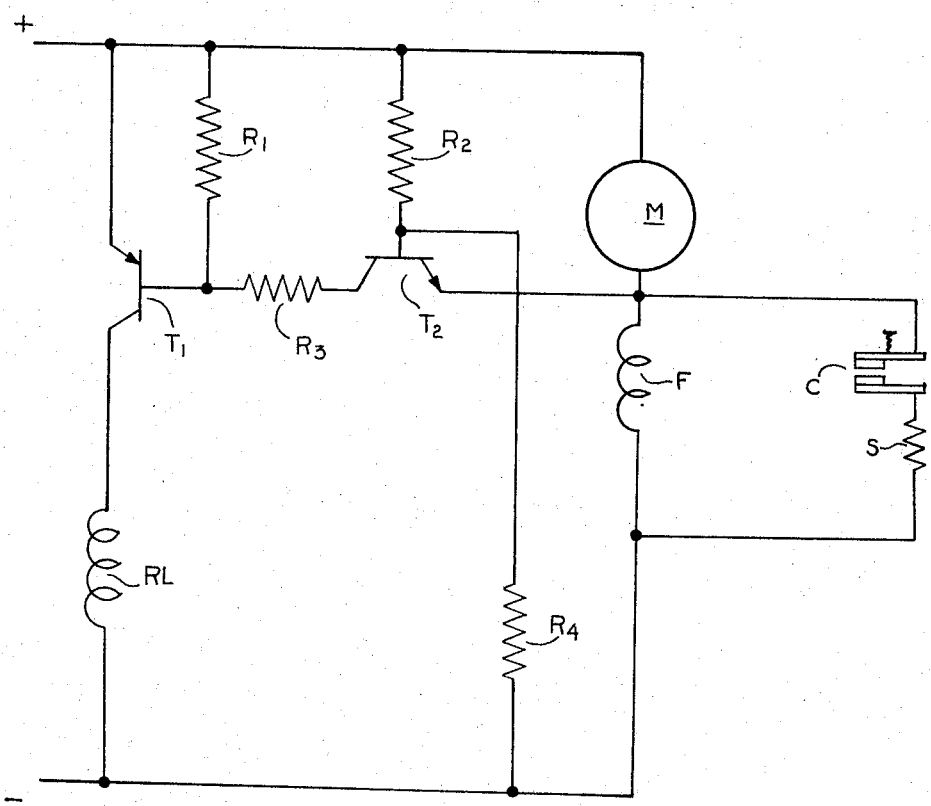
INVENTOR
HERBERT E. MORRIS
BY
John B. Sponsler

United States Patent Office 3,360,705
Patented Dec. 26, 1967

3,360,705
DC MOTOR FIELD CONTROL CIRCUIT
Herbert E. Morris, Roanoke, Va., assignor to General
Electric Company, a corporation of New York
Filed June 1, 1965, Ser. No. 460,134
1 Claim. (Cl. 318—246)

ABSTRACT OF THE DISCLOSURE

A speed control circuit for a direct current motor having its armature back E.M.F. counteracting the negative bias of a normally non-conducting first transistor directly controlling a second normally non-conducting transistor, the second transistor being arranged, when conducting, to apply a shunt across the series field of the motor to increase motor speed. At high speed when a sudden load is placed upon the motor reducing the back E.M.F. of the armature, the negative bias of the first transistor is restored and both transistors become non-conducting thereby removing the shunt and increasing the field excitation to accommodate the load.

This invention relates to the speed control of low voltage direct current motors used in electric traction devices such as battery trucks and the like, and is more specifically concerned with obtaining high motor speed under light loads by the use of a series field shunting control.

Normally battery trucks, or motor driven trucks deriving their operating energy from self-carried batteries, are propelled at relatively low speeds in view of the proportionate loads normally carried; however, in many instances it is desirable to operate these vehicles at higher speeds, particularly when they are used in warehouses where a part of the round trip is under no load conditions. A simple expedient for increasing the speed of a series direct current motor is to reduce the field current by the use of a shunt across the series field; however, if the load increases while the shunt is so connected, the strength of the series field may be insufficient to operate the motor, and serious damage may result to the motor.

An object of the present invention is the provision of an automatic control circuit for connecting and disconnecting a series field shunt in a direct current series motor under control of motor speed.

The invention is set forth with particularity in the appended claim. The principles and characteristics of the invention, as well as other objects and advantages are revealed and discussed through the medium of the illustrative embodiments appearing in the specification and drawing which follow.

In the drawing a series motor having an armature M and a field F is arranged to have a shunt resistor S connected across the field F under control of a pair of normally open contacts C, the latter being actuated to close when a relay RL is energized.

Let it be assumed that the motor armature M and field F in series are connected across the power supply in the polarity indicated, and that a resistor $R_2$ and another resistor $R_4$ form a voltage divider, thereby applying a negative bias to the base of a transistor $T_2$, the latter being of the NPN type, for example. As the motor comes up to speed the back E.M.F. of the armature M increases and the voltage across the field F drops, reducing the negative bias on the transistor $T_2$ until it becomes conductive. Another transistor $T_1$ of the PNP type is controlled by transistor $T_2$—via the voltages set up in resistors $R_1$ and $R_3$, respectively—to become conductive when transistor $T_2$ is conductive. When the transistor $T_1$ therefore becomes conductive the relay RL in the collector circuit of transistor $T_1$ becomes energized, and its contacts C close, placing the resistor S in parallel with the field F. The motor armature M will therefore rotate at greater speed since the magnetic flux of the field F is reduced by the effect of the shunt S reducing the amount of field current.

Under the conditions just enumerated, if a load is placed upon the armature M of the motor, its speed will be reduced, thereby reducing the back E.M.F. and causing the transistor $T_2$ to again become negatively biased. Consequently, both transistors $T_2$ and $T_1$ will stop conducting, and the relay RL will become de-energized, thereby opening the contacts C, removing the shunt S, and increasing the field current of the field F. The values of resistors $R_2$ and $R_4$ can be chosen to bring about the disconnecting of the shunt S from the field F at any reasonable speed of the motor within its operating range, the circuit operating upon a very small change in voltage across the field F.

A Zener diode may be substituted for the resistor $R_4$, if desired, thereby providing more rapid response in the critical area of operation of the circuit; however, the operation of the circuit is substantially the same.

While the invention has been explained and described with the aid of particular embodiments thereof, it will be understood that the invention is not limited thereby and that many modifications retaining and utilizing the spirit thereof without departing essentially therefrom will occur to those skilled in the are in applying the invention to specific operating environments and conditions. It is therefore contemplated by the appended claim to cover all such modifications as fall within the scope and spirit of the invention.

What is claimed is:

A control circuit for a direct current motor having a series field shunt, a transistor, a voltage divider connected with said transistor for deriving a bias to prevent said transistor from conducting, said bias being arranged to be overcome at a predetermined motor speed by the back E.M.F. of the said armature, a second transistor directly under control of the first said transistor, and means under control of the said second transistor for disconnecting said shunt when said back E.M.F. is reduced as a result of decreasing the speed of said motor under load.

References Cited

UNITED STATES PATENTS

| 1,971,747 | 8/1934 | Fletcher | 318—249 |
| 2,777,106 | 1/1957 | Brown | 318—331 X |
| 2,929,009 | 3/1960 | James | 318—327 |
| 3,058,044 | 10/1962 | Herr | 318—246 |
| 3,242,410 | 3/1966 | Cockrell | 318—331 |
| 3,250,979 | 5/1966 | Shaw | 318—331 |

FOREIGN PATENTS

| 619,701 | 10/1935 | Germany | 318—246 |

ORIS L. RADER, *Primary Examiner.*

G. S. SIMMONS, *Assistant Examiner.*